Patented Aug. 10, 1954

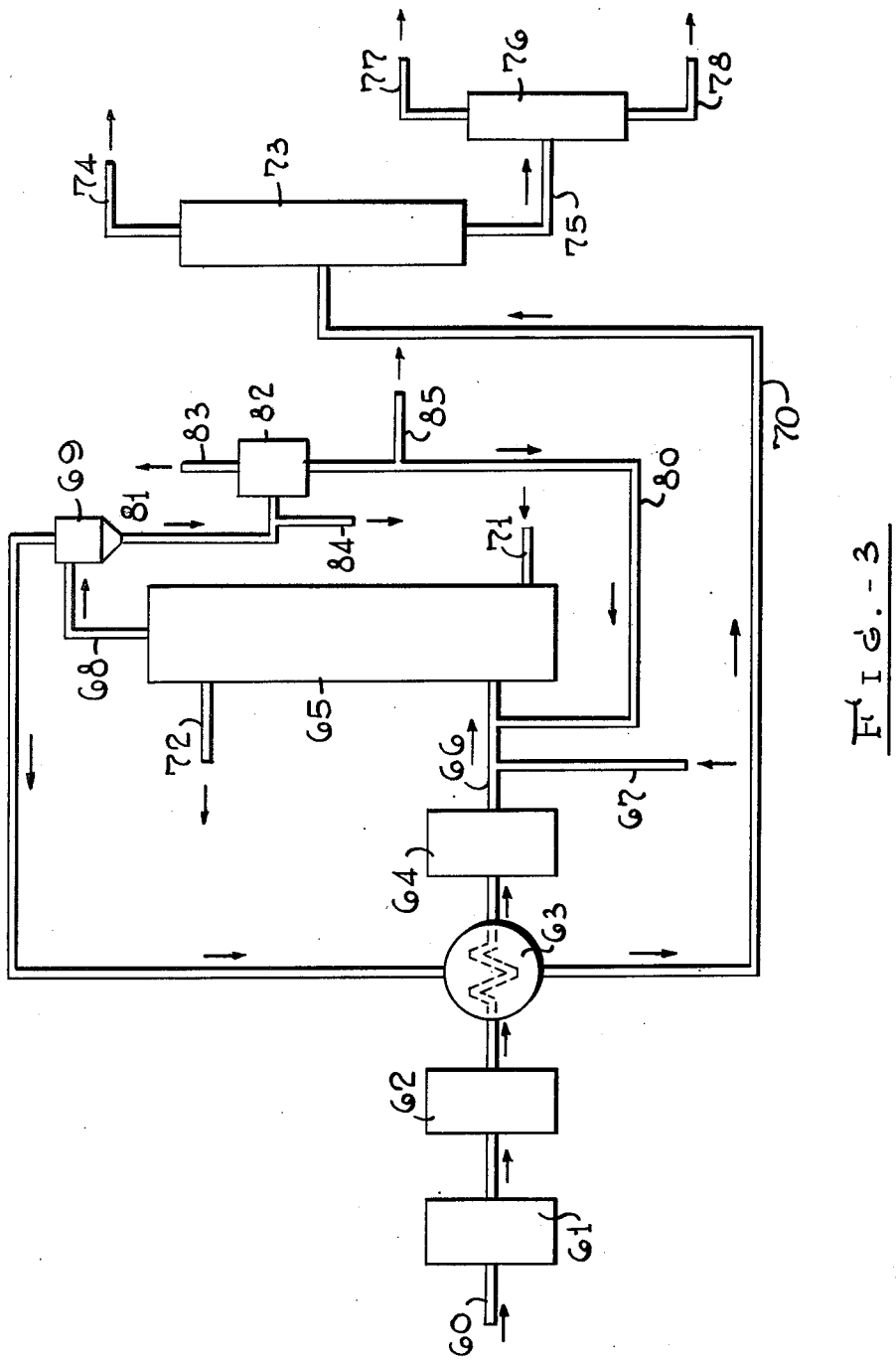

2,686,210

UNITED STATES PATENT OFFICE 2,686,210

CONTROL OF EXOTHERMIC REACTION IN AN OLEFIN POLYMERIZATION PROCESS

Isidor Kirshenbaum, Union, and Charles W. Skarstrom, Hazlet, N. J., assignors to Standard Oil Development Company, a corporation of Delaware Application January 9, 1951, Serial No. 205,146

1 Claim. (Cl. 260—683.15)

The present invention is generally concerned with the control of exothermic reactions. The invention is more particularly concerned with the use of selected hydrates for the control of specific exothermic chemical reactions, as for example, those occurring during catalytic cracking, hydrocarbon synthesis, polymerization, and the like. In accordance with the present invention, hydrates of a particular class of material are utilized in the exothermic reaction in order to secure better temperature control of the reaction.

It is well known in the art to conduct various processes wherein large quantities of heat are evolved and which must be readily and efficiently removed if the temperature and the reaction are to be controlled as desired. In order to secure this result, various procedures have been used, as for example, heat exchangers, various direct cooling means, and the like. These methods, however, have certain disadvantages, particularly when utilized in conjunction with specific processes such as a fluidized solids catalytic cracking process, a hydrocarbon synthesis process and various olefin polymerization processes. In accordance with the present invention, the exothermic heat of reaction is removed by utilizing a selected hydrate either in the fluidized or slurry state.

Figure 1:
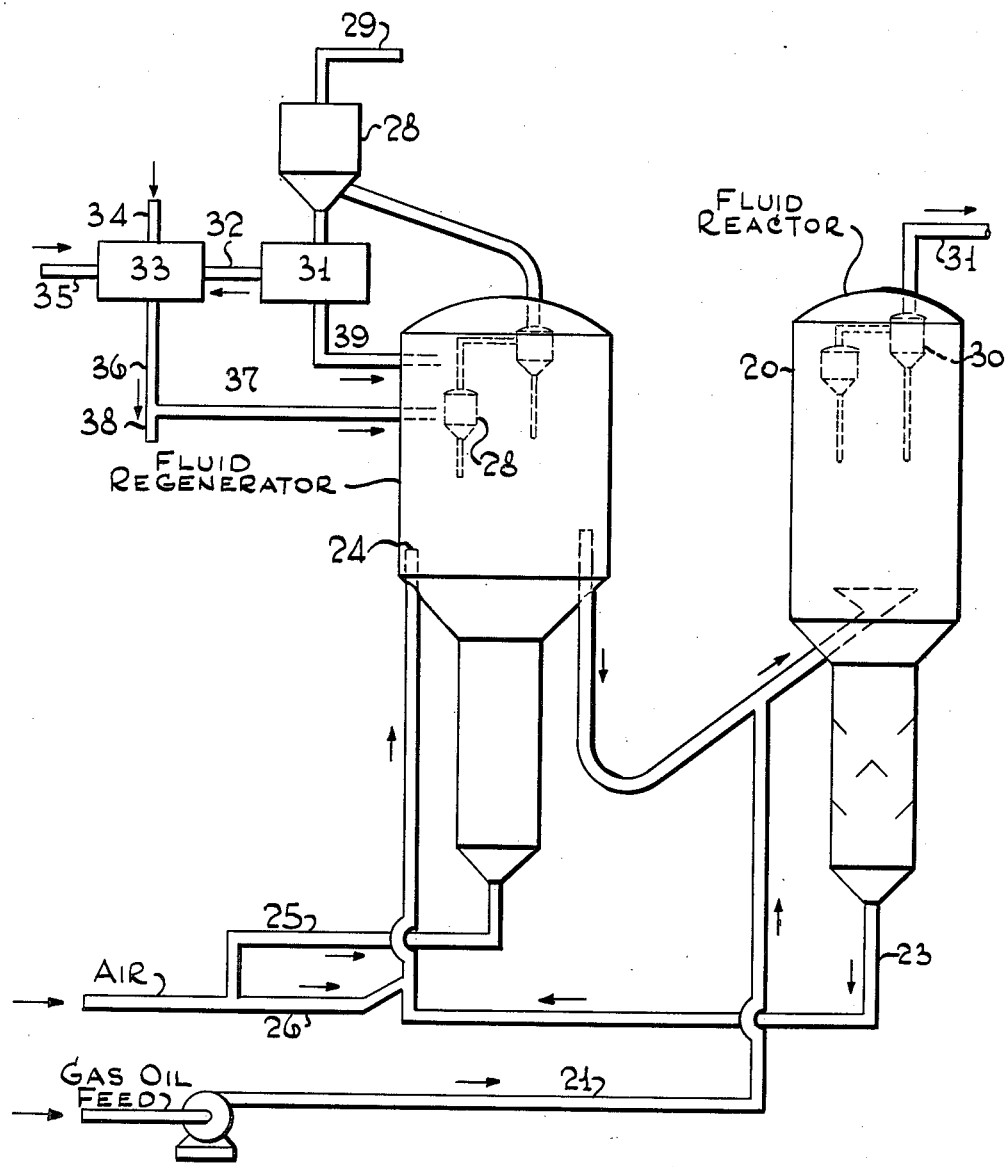
Figure 2:
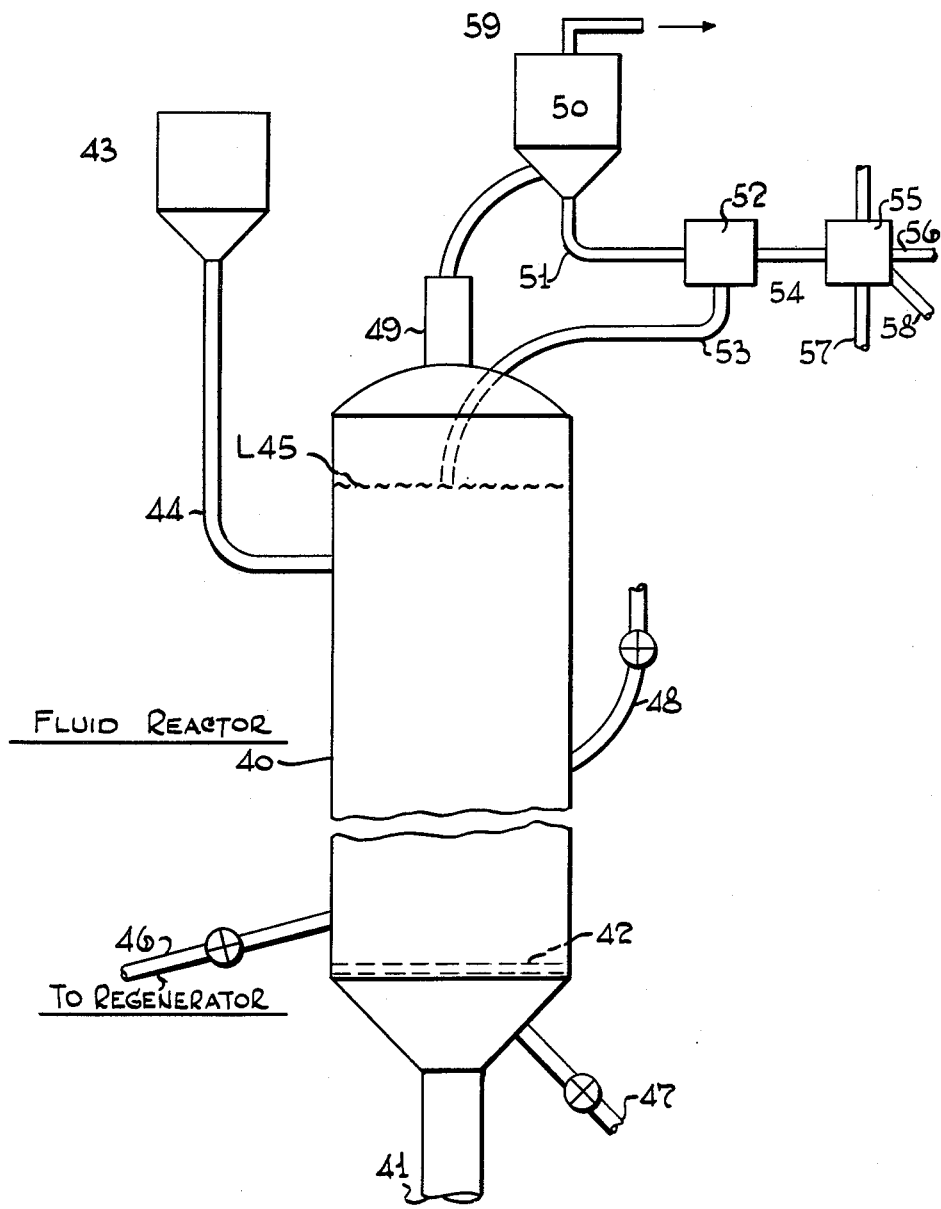

The present invention may be fully understood by reference to the drawings illustrating embodiments of the same with respect to various specific operations. Figure 1 illustrates the present invention when used in conjunction with a fluidized solids catalytic cracking process, while Figure 2 illustrates the operation when used in conjunction with a hydrocarbon synthesis process. Figure 3 illustrates the present invention when used in conjunction with an olefin polymerization operation.

Referring specifically to Figure 1, a hydrocarbon fraction boiling in the gas oil boiling range is introduced into a fluidized solids catalytic reactor 20 by means of line 21. This stream is mixed with fluidized solids catalyst which is introduced into zone 20 by means of line 22 through a distributing head. Temperature and pressure conditions as well as gas velocities and catalyst holdup are adjusted in zone 20 to secure the desired conversion of the relatively high boiling hydrocarbon constituents to lower boiling constituents. Spent catalyst is removed from zone 20 by means of line 23 and passed into a fluidized solids regeneration zone 24. Air or other oxygen containing gas is introduced into zone 24 by means of lines 25 and 26. Temperature and pressure conditions in regeneration zone 24 and catalyst holdup are adjusted to secure the desired burning of the catalyst and to regenerate the same. Regenerated catalyst is removed from zone 24 by means of line 22 and recycled to reaction zone 20. Combustion gases are passed through suitable cyclones 28 positioned in the top of or above regeneration zone 24 and are removed overhead by means of line 29. Cracked products are removed overhead from reaction zone 20 through cyclones 40 and line 41, and are introduced into a fractionation zone.

The fluidized solids technique for processing feed fractions, as for example, petroleum hydrocarbons and for carrying out other chemical reactions, is a conventional one. The system of a fluidized solids technique for cracking hydrocarbons comprises a reaction zone and a regeneration zone, employed in conjunction with a fractionation zone. The reactor and the catalyst regenerator are arranged at approximately an even level. The operation of the reaction zone and the regeneration zone is conventional, which preferably is as follows:

An overflow pan is provided in the regeneration zone at the desired catalyst level. The catalyst overflows into a withdrawal line which preferably has the form of a U-shaped seal leg connecting the regeneration zone with the reaction zone. The feed stream introduced is usually preheated to a temperature in the range from about 500° to 650° F. in exchangers in heat exchange with regenerator flue gases which are removed overhead from the regeneration zone, or with cracked products. The heated feed stream is withdrawn from the exchangers and introduced into the reactor. The seal leg is usually sufficiently below the point of feed oil injection to prevent oil vapors from backing into the regenerator in case of normal surges. Since there is no restriction in the overflow line from the regenerator, satisfactory catalyst flow will occur as long as the catalyst level in the reactor is slightly below the catalyst level in the regenerator when vessels are carried at about the same pressure. Spent catalyst from the reactor flows through a second U-shaped seal leg from the bottom of the reactor into the bottom of the regenerator. The rate of catalyst flow is controlled by injecting some of the air into catalyst transfer line to the regenerator.

The pressure in the regenerator may be controlled at the desired level by a throttle valve in the overhead line from the regenerator. Thus, the pressure in the regenerator may be controlled at any desired level by a throttle valve which may be operated, if desired, by a differential pressure controller. If the pressure differential between the two vessels is maintained at a minimum, the seal legs will prevent gases from passing from one vessel into the other in the event that the catalyst flow in the legs should cease.

The reactor and the regenerator may be designed for high velocity operation involving linear superficial gas velocities of from about 2.5 to 4 feet per second. However, the superficial velocity of the upflowing gases may vary from about 1–5 and higher. Catalyst losses are minimized and substantially prevented in the reactor by the use of multiple stages of cyclone separators. The regeneration zone is provided with cyclone separators. These cyclone separators are usually from 2 to 3 and more stages.

Distributing grids may be employed in the reaction and regeneration zones. Operating temperatures and pressures may vary appreciably depending upon the feed stocks being processed and upon the products desired. Operating temperatures are, for example in the range from about 800° to 1000° F., preferably about 850°–950° F., in the reaction zone. Elevated pressures may be employed, but in general, pressures below 100 lbs. per sq. in. gauge are utilized. Pressures generally in the range from 1 to 30 lbs. per sq. in. gauge are preferred. A catalyst hold-up corresponding to a space velocity of 1 to 20 weights per hour of feed per weight of catalyst is utilized. A preferred ratio is 2 to 4. Catalyst to oil ratios of about 3 to 10, preferably about 6 to 8 by weight are used.

The catalytic material used in the fluidized catalyst cracking operation, in accordance with the present invention, are conventional cracking catalysts. These catalysts are oxides of metals of groups II, III, IV and V of the periodic table. A preferred catalyst comprises silica-alumina wherein the weight per cent of the alumina is in the range from about 5 to 20%. Another preferred catalyst comprises silica-magnesium where the weight per cent of the magnesia is about 5% to 20%. These catalysts may also contain a third constituent, as for example, $ThO_2$, $WO_3$, $MoO_3$, $BeO$, $Bi_2O_3$, $CdO$, $UO_3$, $B_2O_3$, $SnO_2$, $Fe_2O_3$, $V_2O_5$, $MnO$, $Cr_2O_3$ $CaO$, $Tl_2O_3$, $MgO$ and $Ce_2O_3$ present in the concentration from 0.05% to 0.5%.

The size of the catalyst particles is usually below about 200 microns. Usually at least 50% of the catalyst has a micron size in the range from about 20–80. Under these conditions with the superficial velocities as given, a fluidized bed is maintained wherein the lower section of the reactor, a dense catalyst phase exists while in the upper area of the reactor a dispersed phase exists.

In an operation as described, it is necessary to control the temperature in the regenerator (24) in order to prevent afterburning in the regenerator. Although it is desirable to operate the regenerator at a dense bed temperature as high as 1150° F., it has been found that at temperatures as high as this, the CO in the flue gas tends to oxidize to $CO_2$. This afterburning may raise the flue gas to the excessive temperatures of 1400–1600° F. Heretofore, water sprays were located in the upper part of the regenerator to quench the flue gas in the event of afterburning. However, this procedure has the disadvantage of introducing large amounts of steam which causes a loss of catalyst activity. In accordance with the present invention, the afterburning can be controlled without loss of catalyst activity by introduction of a suitable decomposable hydrate instead of the water. Although the hydrate may be added at a multiple of points in the regenerator, it is preferred that the hydrate be introduced, above the dense bed into the zone where afterburning occurs, by means of line 37. It is also preferred that the particle size of the decomposable hydrate be below about 40 microns, preferably below 20 microns. The hydrate undergoes decomposition in this low density zone and in doing so, cools down the flue gases sufficiently to prevent afterburning. The decomposed hydrate, because of its small particle size, flows upwards and is withdrawn from the flue gases via the cyclones 28. Although it is sometimes economical to reject the decomposed hydrate, it is preferable to recover the material, rehydrate and recycle the hydrate to the regenerator. In this case, the material from the cyclones 28, contaminated with catalyst fines, is led via line 30 into solids separator 31. In this solids separator, the catalyst fines are removed from the decomposed hydrate by any of the methods known in the art, as, for example, by electrostatic means, or by taking advantage of differences in density, a separation is carried out by application of Stokes' law. The catalyst fines may be rejected, returned to the regenerator or returned to the reactor via line 39. The decomposed hydrate is led via line 32 into the rehydrator 33. Steam or water spray is introduced via line 35 in such a manner that the hydrated material is withdrawn via line 36 at a temperature below the dehydration temperature. When, for example, the hydrate used is $MgSO_4 \cdot H_2O$, the preferred temperature range is 230°–400° F. The hydrated material is recycled to the regenerator via line 37. Hydrate can be removed from the unit via line 38 and make-up hydrate added via line 34. By controlling the particle size of the hydrate entering the regenerator and by use of a suitable cyclone arrangement, it is possible to obtain a solids mixture from the cyclones 28 containing only a small quantity of catalyst fines. In such a case, there is no need for the solids separator 31, the entire solids mixture being sent directly to the rehydrator unit 33.

With respect to an operation as illustrated by Figure 2, it is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt, and nickel. The catalysts are utilized either alone or are employed in conjunction with carriers such as kieselguhr, diatomaceous earth, synthetic gels, silica, and alumina. Promoters such as oxides of chromium, zinc, aluminum, magnesium, and the rare earth metals are used with the iron group metals. These catalysts are employed in either fixed bed or fluid catalyst operations.

The temperatures employed in the synthesis reaction zone vary widely, as for example in the range from about 300° F. to about 800° F., and are generally in the range from about 350° F. to about 725° F. The pressures, likewise, vary considerably and are a function of other operating conditions such as catalyst employed, activity of the catalyst, character of the feed gases, and the temperatures utilized. Pressures in the range from about 1 to about 100 and higher atmospheres have been suggested. The character of the feed gases introduced into the synthesis reaction zone depends somewhat on the particular temperatures and pressures, and upon the catalyst employed. For example, when employing cobalt type catalysts, it is preferred to use about 1 mol of carbon monoxide to about 2 mols of hydrogen, while when an iron catalyst is utilized, equal mols of hydrogen and carbon monoxide in the feed synthesis gases are desirable.

The synthesis gases comprising hydrogen and carbon monoxide are produced by various procedures. Methane or natural gas may be oxidized with a reducible metal oxide, with pure oxygen, or with gases comprising oxygen. Other feed stocks may comprise coal, shale, and other hydrocarbons. The reaction may be conducted in a single stage or in a plurality of stages. For example, one procedure is to employ a two-stage reforming process using steam and carbon dioxide for the production of carbon monoxide and hydrogen. When employing methane as feed gas and oxidizing the same with a reducible metal oxide, the reactions are generally conducted at temperatures in the range from about 1400° F. to about 2000° F. When the synthesis gases are produced, by utilizing oxygen and natural gases, the temperatures in the reaction zone are usually in the range from about 2000 to about 3000° F.

It is also known in the art to contact synthesis gases and fluidized solids by passing the gases upwardly through an enlarged treating zone, containing a body of the finely-divided solid catalyst to be contacted, at a controlled velocity to maintain the solids in the treating zone in quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed. The general operating conditions are similar to those described with respect to the cracking operation.

Processes of this character wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate.

Referring specifically to Figure 2, in operation, gaseous reactants such as a synthesis gas mixture of hydrogen and carbon monoxide in the ratio of about 1-2 moles of $H_2$ to 1 mol of CO are introduced into reactor 40 by means of line 41. These gases flow upwardly through a perforated member such as a distributing grid 42 which is inserted to assure proper distribution of gases through reactor 40.

A synthesis catalyst, such as an iron catalyst, is maintained in zone 40 in the form of a powder having a particle size of about 20–200 microns or higher. When starting up the process, the catalyst may be supplied to reactor 40 from catalyst hopper 43 through pipe 44. The linear velocity of the gases within reactor 40 is kept within the approximate range of 0.3–5 ft. per second, preferably within the range of 0.5–1.5 ft. per second for the particle sizes indicated above. If, however, larger particle sizes, say up to ¼ in. are used, the linear gas velocity may be as high as 5–10 ft. per second.

At the conditions of particle size and gas flow indicated, the catalyst takes the form of a dense, turbulent mass resembling a boiling liquid having a well defined upper level 45 and having an apparent density of about 30–150 lbs. per cu. ft., depending on the fluidization conditions. Catalyst of undesirable composition may be withdrawn continuously or intermittently through pipe 46 to be regenerated and returned to reactor 40 in any manner.

The synthesis reaction is exothermic and it is necessary to remove heat in order to maintain the reaction temperature preferably between about 500° and 750° F. In accordance with the present invention, the excess heat is removed by introduction of a suitable hydrate into the fluidized catalyst bed. The hydrate may be added with the catalyst via lines 47 and 41 or it may be added to the reactor at one or more intermediate points, as, for example, via line 48. It is preferred that the hydrate particles be a size of less than about 40 microns, preferably below about 20 microns. The hydrate undergoes decomposition in the reactor and in doing so, absorbs the excess heat of reaction. The decomposed hydrate then flows upward, together with volatile reaction products, unreacted gases, and entrained catalyst fines through line 49 and through a gas-solids separator 50, such as a cyclone or filter, from which the separated solids are led via line 51 into the the solids separator 52. In unit 52 the iron catalyst is separated from the decomposed hydrate by magnetic means or by any of the methods described in reference to Figure 1. The catalyst fines are rejected, sent to the regenerator or returned to the reactor via line 53, while the decomposed hydrate is led via line 54 into the rehydrator 55. The decomposed hydrate is treated in the rehydrator with steam, introduced via line 56 in a manner such that the hydrated material withdrawn via line 57 is at a temperature below the dehydration temperature. When using $ZnSO_4.H_2O$ as hydrate, the preferred temperature is 220–400° F., whereas if $ZnSO_4.2H_2O$ is the hydrate being utilized, the preferred temperature range is 80–220° F. The hydrated material is recycled to the synthesis reactor via line 57. Hydrate may be removed from the unit via line 58 and makeup hydrate is added via line 59. By controlling the particle size of the hydrate entering the synthesis reactor and by use of a suitable cyclone arrangement, it is possible to obtain a solids mixture from line 51 in Figure 2 containing only a small quantity of catalyst fines. In such a case, there is no need for solids separator 52, the entire solids mixture being sent directly to the rehydrator unit 55.

It is often convenient to remove part of the heat of reaction by a device such as an internal heat exchanger and part of the heat by the decomposable hydrate. When relatively large amounts of hydrate are used for heat removal, it is necessary to adjust to $H_2/CO$ feed ratio as well as the temperature of the reactor in order to obtain optimum catalyst activity. As is pointed out in Report 248-45 of the U. S. Naval Technical Mission, May 24, 1946, an iron synthesis catalyst of optimum activity should not contain more than 5-8% free Fe based on the total iron present. Now the reduction state of the catalyst depends upon the reducing or oxidizing character of the gas phase and is a function of the partial pressure ratios of $H_2/H_2O$ and $CO/CO_2$. At 650° F., for example, these functions are:

$H_2/H_2O > 15$ = reducing
$H_2/H_2O < 15$ = oxidizing
$CO/CO_2 > 0.56$ = reducing
$CO/CO_2 < 0.56$ = oxidizing The magnitude of these ratios is determined by the amount of $H_2$, CO, and hydrate added to the system as well as by the water gas equilibrium which is a function of temperature. This functional relationship, as determined by thermodynamic calculations is as follows:

| Temp., °F. | $\frac{H_2xCO_2}{COxH_2O}$ |
| --- | --- |
| 550 | 45.2 |
| 570 | 37.8 |
| 590 | 33.0 |
| 610 | 28.6 |
| 630 | 24.9 |
| 650 | 21.7 |
| 670 | 19.1 |

Referring to an operation illustrated by Figure 3, it is well known in the art to treat olefins and olefin-containing streams with various catalysts, as for example, with acids of phosphorus in order to polymerize the olefins to higher boiling hydrocarbon constituents. In general, the feed streams comprise normally gaseous olefins, such as ethylene, propylene, butylenes, pentylenes and mixtures thereof, which are polymerized to hydrocarbon constituents which boil in the range below about 420° F. Although 100% olefinic streams may be utilized as feed stocks, it is generally preferred to have paraffinic diluents present in a concentration in the range of from about 40% to 90% by weight in order to reduce the formation of carbonaceous deposits on the catalyst and to provide better temperature control in the catalyst bed. The phosphoric acid in the catalyst is usually deposited on solid carriers, as for example, diatomaceous earth, silica gel, and the like. In general, these catalysts are satisfactory for securing the polymerization of the olefins in the feed.

It is well known that if the temperature of the reaction is not controlled, solid, phosphoric acid type olefin polymerization catalysts tend to soften and disintegrate in conventional chamber and tubular olefin polymerization units. The loss of mechanical strength with resultant disintegration causes pressure build up in the unit and poor contacting due to feed channeling within the bed. Inasmuch as the mechanical failure of these catalysts frequently necessitates catalyst replacement, even though intrinsic activity is unaffected, it is highly important that every effort be made to control the temperature and to avoid mechanical failure of the catalyst. As the catalyst disintegrates the fines tend to be washed downwardly in the reaction zone tending to accumulate at the bottom. As the accumulation of fine catalyst particles builds up, the pressure drop across the reactor builds up thus adversely affecting operating conditions of the entire reactor.

Also in a proper operation of a polymerization unit, it is necessary to maintain the catalyst in an optimum state of hydration by continuously controlling the water content of the olefin containing feed stream. In actual operation, it has been found difficult to control the water addition rates in such a way that the required amount of water is present at all times over the whole catalyst bed. Often there is an excess of water in one part of the bed and a deficiency of water in another, with the deficiency frequently occurring in the hottest part of the bed. Consequently, there has been need in the art for a process whereby the amount of water present over any portion of the catalyst bed is determined by the temperature of the bed itself. Moreover, in the polymerization reactor, the extent to which the catalyst deteriorates is to a large extent a function of temperature control in the catalyst bed and good temperature control is extremely difficult, especially when hot spots develop. These difficulties, as well as others, are overcome by the present invention wherein a decomposable hydrate is added to the reactor with the feed.

This embodiment of the present invention may be readily understood by reference to the diagrammatical drawing in Figure 3 illustrating the same. Referring specifically to the drawing illustrating a fixed bed chamber and tubular operation, feed gases comprising $C_3$ and $C_4$ olefins are introduced into the system by means of line 60. Hydrogen sulphide is removed from the gases in zone 61 and mercaptans removed in zone 62 by any suitable means. Other feed impurities may be removed in these or additional treating stages. The feed gases, free of harmful impurities, are passed through heat exchanger zone 63, preheated to the desired temperature in zone 64 and then introduced into the bottom of reactor 65 by means of line 66. Water may be added to the feed gases in order to help maintain catalyst activity by means of line 67. The feed gases flow upwardly in zone 65; are removed together with the product from the top of zone 65 by means of line 68, cyclones 69, and line 70. Since the polymerization reaction is highly exothermic, and since reactor temperature control is very important in terms of catalyst life and polymer quality, the average desired temperature is maintained in the reactors by means of water circulation which is introduced around the tubes in reactors 65 by means of line 71. Water or steam is withdrawn from the respective reactors by means of line 72. The tubes of reactor 65 contain a suitable polymerization catalyst, as for example, phosphoric acid deposited on a silica gel carrier.

The reaction product removed via line 70 is passed through heat exchanger 63 and introduced into stabilization zone 73. Hydrocarbons boiling in the range of propane and lower are removed overhead from stabilizer 73 by means of line 74 while the higher boiling constituents are removed by means of line 75 and introduced into a debutanizer unit 76. Butane is removed overhead from zone 76 by means of line 77 while the higher boiling constituents are removed by means of line 78. The reaction zone 65 as well as zones 73 and 76 may comprise any suitable number and arrangement of stages. The polymer product stream removed by means of line 78 may be fractionated in order to secure the desired boiling range product or further refined and handled as desired.

In the polymerization reactor the extent to which the catalyst deteriorates is to a large extent a function of temperature control in the tubes. This control is accomplished in accordance with this invention by introducing a decomposable hydrate such as $ZnSO_4 \cdot H_2O$ by means of line 80 with the feed. This decomposable hydrate decomposes at a point in the tube where the temperature exceeds the permissible maximum, thus reducing the same and also adding water at this point to the catalyst. The hydrate added as a powder flows upward with the feed gases and reaction products and is removed from the reactor via line 68, cyclones 69 and line 81. The decomposed hydrate is then led into rehydrator 82. Since some of the hydrate becomes coated by deposition of high molecular wt. polymer, the purity of the hydrate is maintained by periodically or continuously adding fresh or regenerated hydrate via line 83 and removing used solids via line 84 or 85.

Although described for the polymerization of olefins in a fixed bed type of operation using a phosphoric acid catalyst, this invention as applied to polymerization is not limited thereunto. It may be used in connection with a fluid operation or in a slurry type of operation. This invention finds special utility with catalysts of the Friedel-Crafts and silica-alumina type.

In the application of this invention, a hydrate such as $MgSO_4.H_2O$ is injected as a fluidized solid into the reaction zone. This hydrate in coming up to the temperature of the reaction decomposes according to the equation $$MgSO_4.H_2O \rightleftharpoons MgSO_4 + H_2O$$

In doing so, the injected solid absorbs large amounts of heat; for example, if the $MgSO_4.H_2O$ is injected at a temperature of about 250° F. into a reactor operating at 1000° F., the heat absorbed is over 100,000 calories per lb. of hydrate. The solid, when it leaves the reactor, is heat exchanged with the cold feed, rehydrated with steam in the temperature range of 230–400° F. and recycled to the reactor.

In another application of this invention, a hydrate such as $ZnSO_4.H_2O$ is injected as a fluidized solid into the reaction. This hydrate in coming up to the temperature of the reaction, decomposes according to the equation $$ZnSO_4.H_2O \rightleftharpoons ZnSO_4 + H_2O(g)$$

In doing so, the injected solid absorbs large amounts of heat; for example, if the $ZnSO_4.H_2O$ is injected at a temperature of 450° F. into a reactor operating at 1200° F., the heat absorbed is about 85,000 calories per lb. of hydrate.

Temperature ranges over which typical hydrates may be used according to this invention are shown in the following table:

| Hydrate | Approximate Temperature Range for Use as Heat Transfer Medium, °F. | Approximate Temperature of Rehydration at about Atm. Pressure and Below |
|---|---|---|
| $MgSO_4.2H_2O$ | 250–1,630 | 100–230 |
| $MgSO_4.H_2O$ | 400–1,630 | 230–400 |
| $CdSO_4.2H_2O$ | 125–1,520 | 90–100 |
| $CdSO_4.H_2O$ | 350–1,520 | 100–340 |
| $ZnSO_4.2H_2O$ | 250–1,300 | 80–220 |
| $ZnSO_4.H_2O$ | 440–1,300 | 220–400 |
| $CaSO_4.H_2O$ | 220–2,000 | 100–170 |
| $2CaSO_4.H_2O$ | 350–2,000 | 170–300 |
| $CoSO_4.7H_2O$ | 75–1,300 | <50 |
| $CoSO_4.H_2O$ | 575–1,300 | 130–525 |
| $CuSO_4.5H_2O$ | 125–1,250 | <80 |
| $BaBr_2.2H_2O$ | 300–1,520 | 70–160 |
| $BaCl_2.2H_2O$ | 300–1,750 | 70–160 |
| $LiCl.H_2O$ | 200–1,100 | 70–160 |

Other hydrates which may be used are the hydrates of carbonates, fluorides, phosphates, and the like. For example, hydrates of $Na_2CO_3$ at temperatures below 1550° F. are satisfactory, as well as $Na_4P_2O_7.10H_2O$ at temperatures below about 1500° F. Aluminum fluoride hydrate may be used at a temperature above about 500° F. Other sulfates which may be used are the hydrates of manganese, aluminum, iron, nickel and magnesium. Satisfactory sulfates are the hydrates of cobalt, copper, nickel and magnesium.

In a catalytic cracking operation wherein it is desired to maintain the temperature in the regenerator in the range from about 1100 to 1200° F., particularly desirable hydrates comprise magnesium sulfate, zinc sulfate and aluminum sulfate. These compounds are very stable under the conditions existing in the regenerator and have a high heat absorption value. For identical reasons, the preferred hydrates for use in a Fischer synthesis operation comprise magnesium sulfate, zinc sulfate and aluminum sulfate. However, in an olefin polymerization reaction where, for example, a fixed bed is utilized employing a phosphoric acid catalyst on a solid carrier such as kieselguhr at temperatures of about 400° F. and at pressures of 1000 lb. the desirable hydrates comprise the phosphates of copper, cobalt and nickel. The hydrates of sulfates of magnesium, zinc and aluminum are also satisfactory. However, the phosphates of cobalt, copper and nickel are preferred. If the polymerization comprises a fluidized solids, one wherein the catalyst is, for example, a 12%–16% aluminum–88%–84% silica catalyst, and wherein the temperatures are in the range from 500 to 650° F. and the pressures less than about 100 lbs. per sq. in. gauge, the desirable hydrates comprise the sulfates of magnesium, zinc and aluminum.

This invention may be used for controlling the temperature of both catalyzed and uncatalyzed reactions. It may also be used for rapid cooling or quenching of reactants and products. When used with a fluidized solid catalyst, the added hydrate may be made of sufficiently small particle size so as to be easily removed from the catalyst upon leaving the reactor. Although hydrates are most conveniently used for many reactions, a reversibly decomposable compound such as a carbonate may be used. $CO_2$ is then used for regeneration. A decomposable carbonate is especially applicable where the presence of steam may harm the catalyst or reactant.

The cooling technique of the present invention may be applied to such reactions as oxidation, hydrogenation, polymerization, hydrocarbon synthesis, and the like. It may also be used for controlling regeneration operations. Where convenient, the decomposable solid may be circulated through coils in the reactor bed.

For instance, if a carbonate is utilized, the temperatures of operation and the temperatures of regeneration for several carbonates are as follows:

| Carbonate | Lower Temp. for Use as Heat Transfer Medium | Approx. Tem. for Regeneration at Atmospheric Pressure |
|---|---|---|
| $CdCO_3$ | Above 600 | Less than 550. |
| $PbCO_3$ | Above 340 | Less than 300. |
| $MgCO_3$ | Above 925 | Less than 875. |
| $FeCO_3$ | Above 650 | Less than 600. |
| $ZnCO_3$ | Above 650 | Less than 600. |

The upper limit of operation is the melting point, the decomposition point or the volatilization temperature of the oxide. The regeneration may be carried out in an atmosphere of carbon dioxide at the temperatures shown above. However, by increasing the pressure of the carbon dioxide, the regeneration can be conducted at temperatures above those shown. Thus, at two atmospheres pressure of carbon dioxide, the regeneration reaction CdO+CO₂→CdCO₃ can be carried out at 700° F. In regeneration, it is advisable to have some water vapor present which serves to accelerate the regeneration process. In some instances, regeneration can be conducted employing flue gases, especially when using magnesium carbonate.

For instance, in an application of this invention where the presence of water is objectionable, a carbonate can be used such as magnesium carbonate. When this carbonate is injected as a fluidized solid at 350° F. and brought up to the reaction temperature of 1100° F., as in a regenerator of a fluid catalytic cracking process, the carbonate decomposes according to the equation $$MgCO_3 \rightarrow MgO + CO_2$$

In so doing, the injected solid absorbs large amounts of heat amounting to over 200,000 calories per pound of carbonate.

Also, in another process of fluidized catalytic polymerization the carbonate of cadmium can be used to absorb heat in the polymerization reactor. The decomposition of the fluidized carbonate follows the equation $$CdCO_3 \rightarrow CdO + CO_2$$

In so doing, the injected fluidized carbonate absorbs large amounts of heat; for example, CdCO₃ injected at 150° F. into a reactor operating at 650° F. absorbs over 86,000 calories per pound of solid. It thus can be utilized to absorb heat by decomposition within the reaction zone and thereby balance the heat evolved by the polymerization reaction, making the spatial distribution of temperature more nearly uniform.

The invention is broadly concerned with the use of decomposable hydrates and carbonates for controlling exothermic reactions. It is particularly concerned with controlling the temperatures in catalytic cracking, Fischer synthesis and olefin polymerization processes. In an olefin polymerization process utilizing a silica-alumina catalyst the preferred hydrate comprises $$ZnSO_4.H_2O$$

whereas in a catalytic cracking operation, the preferred hydrate to be used is MgSO₄.H₂O. If a carbonate be employed, the preferred carbonate for a catalytic cracking operation comprises magnesium carbonate and for a hydrocarbon synthesis process comprises iron carbonate. In a polymerization process, the preferred carbonates are cadmium carbonate, lead carbonate and zinc carbonate.

Having described the invention, it is claimed:

In an olefin polymerization process wherein a phosphoric acid catalyst is utilized on a solid carrier, the improvement which comprises adding to the feed a decomposable hydrated compound selected from the class consisting of phosphates of cobalt, copper, and nickel, thereafter passing the feed at suitable polymerization temperatures and pressures through a bed of said catalyst, whereby said decomposable compound will decompose due to the evolution of heat, thereby preventing an excessive temperature rise and hydrating said catalyst.

References Cited in the file of this patent

UNITED STATES PATENTS

| Number | Name | Date |
|---|---|---|
| 2,288,873 | D'Ouville | July 7, 1942 |
| 2,291,216 | Gerhold | July 28, 1942 |
| 2,456,072 | Marisic | Dec. 14, 1948 |
| 2,569,092 | Deering | Sept. 25, 1951 |